United States Patent
Osterweil et al.

(10) Patent No.: US 11,411,912 B2
(45) Date of Patent: Aug. 9, 2022

(54) METHODS AND SYSTEMS FOR DOMAIN NAME DATA NETWORKING

(71) Applicant: VERISIGN, INC., Reston, VA (US)

(72) Inventors: Eric Osterweil, Fairfax, VA (US); G. Craig Murray, Bethesda, MD (US); Abedelaziz Mohaisen, Williamsville, NY (US); Danny McPherson, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 787 days.

(21) Appl. No.: 15/147,387

(22) Filed: May 5, 2016

(65) Prior Publication Data

US 2017/0019371 A1   Jan. 19, 2017

Related U.S. Application Data (60) Provisional application No. 62/194,079, filed on Jul. 17, 2015.

(51) Int. Cl.
*H04L 61/4511* (2022.01)
*H04L 67/568* (2022.01)
*H04L 9/40* (2022.01)

(52) U.S. Cl.
CPC ...... *H04L 61/1511* (2013.01); *H04L 67/2842* (2013.01); *H04L 63/126* (2013.01)

(58) Field of Classification Search
CPC . H04L 61/1511; H04L 67/2842; H04L 63/126
USPC .......................................................... 709/213
See application file for complete search history.

(56) References Cited

U.S. PATENT DOCUMENTS

| | | | | | |
|---|---|---|---|---|---|
| 6,108,703 | A | * | 8/2000 | Leighton | G06F 17/3089 709/226 |
| 8,874,718 | B2 | * | 10/2014 | Yang | H04L 29/12066 709/223 |
| 2010/0106833 | A1 | * | 4/2010 | Banerjee | H04L 29/12066 709/226 |
| 2012/0317188 | A1 | * | 12/2012 | Fredricksen | H04L 67/02 709/213 |

(Continued)

OTHER PUBLICATIONS

Y. Yu, D. Wessels, M. Larson, and L. Zhang. "Authority server selection in DNS caching resolvers", ACM SIGCOMM Computer Communication Review, https://irl.cs.ucla.edu/data/files/papers/res_ns_selection.pdf (Year: 2012).*

(Continued)

*Primary Examiner* — James E Springer
*Assistant Examiner* — Patrick F Ngankam
(74) *Attorney, Agent, or Firm* — Baker Botts L.L.P.; Michael A. Sartori (57) ABSTRACT

Systems, devices and methods for a Domain Name Data Networking (DNDN) content delivery system are disclosed. Embodiments perform operations including obtaining a content object having a unique identifier. The operations also include storing a local instance of the content object in association with DNS resource records and the unique identifier. The operations further include providing the local instance of the content to a client in response to receiving a request from the client including the unique identifier.

15 Claims, 4 Drawing Sheets

(56) References Cited

U.S. PATENT DOCUMENTS

| | | | | |
|---|---|---|---|---|
| 2013/0036307 A1* | 2/2013 | Gagliano | ............ | H04L 63/0823 713/171 |
| 2013/0191499 A1* | 7/2013 | Ludin | ................ | H04L 61/1511 709/217 |
| 2014/0181268 A1* | 6/2014 | Stevens | ............... | H04L 67/2804 709/219 |
| 2016/0380986 A1* | 12/2016 | Millar | ................... | G06F 21/606 709/206 |
| 2018/0309713 A1* | 10/2018 | Brown | ................ | H04L 61/1511 |

OTHER PUBLICATIONS

Sevilla et al. "iDNS: Enabling Information Centric Networking Through The DNS", https://ieeexplore.ieee.org/stamp/stamp.jsp?tp=&arnumber=6849278 (Year: 2014).*

Sevilla et al. "iDNS: Enabling Information Centric Networking Through The DNS", https://ieeexplore.ieee.org/stamp/stamp.jsp?arnumber=6849278 (Year: 2014).*

Named data networking: Motivation & details, http://named-data.net/project/archoverview/.

Open resolver project, http://openresolverproject.org/.

Availability problems in the dnssec deployment. In RIPE 58, 2009. http://www.ripe.net/ripe/meetings/ripe-58/content/presentations/dnssec-deployment-problems.pdf.

R. Arends, R. Austein. M. Larson, D. Massey, and S. Rose. Protocol Modifications for the DNS Security Extensions. RFC 4035, Mar. 2005.

D. Atkins and D. Austein. Threat Analysis of the Domain Name System (DNS). RFC 3833, Aug. 2004.

R. Bellis. Dns proxy implementation guidelines. RFC 5625, Aug. 2009.

S. M. Bellovin. Using the domain name system for system break-ins. In Proceedings of the Fifth Usenix Unix Semrity Symposium, pp. 199-208, 1995.

S. K. Fayazbakhsh, Y. Lin, A. Tootoonchian, A. Ghodsi, T. Koponen, B. Maggs, K. Ng, V. Sekar, and S. Shenker. Less pain, most of the gain: Incrementally deployable icn. In ACM SIGCOMM Computer Communication Review, vol. 43, pp. 147-158. ACM, 2013.

C. Ghali, G. Tsudik, and E. Uzun. Network-layer trust in named-data networking. Computer Communication Review, 44(5): 12-19, 2014.

A. Ghodsi, S. Shenker, T. Koponen, A. Singla, B. Raghavan, and J. Wilcox. Information-centric networking: seeing the forest for the trees. In Proceedings of ACM HotNets, 2011.

A. Hubert and R. Van Mook. Measures for making dns more resilient against forged answers. RFC 5452, 2009.

V. Jacobson, D. K. Smelters, J. D. Thornton, M. F. Plass, N. H. Briggs, and R. Braynard. Networking named content. In Proceedings of ACM CoNEXT, pp. 1-12, 2009.

D. Kaminsky. Explorations in namespace: White-hat hacking across the domain name system. Commun. ACM, 49 (6):62-69, Jun. 2006.

Mirjam Kuhne. Update on as path lengths over time. https://labs.ripe.net/Members/mirjam/update-on-as-path-lengths-over-time.

P. Mockapetris and K. J. Dunlap. Development of the domain name system. In SIGCOMM '88, pp. 123-133, 1988.

A. Mohaisen, H. Mekky, X. Zhang, H. Xie, and Y. Kim. Timing attacks on access privacy in information centric networks and countermeasures. IEEE TDSC, 2015.

K. Schomp, T. Callahan, M. Rabinovich, and M. Allman. On measuring the client-side dns infrastructure. In Proceedings of the 2013 conference on Internet measurement conference, pp. 77-90. ACM, 20 13.

C. Wang, J. Li, F. Ye, and Y. Yang. Netwrap: An ndn based real-timewirelcss recharging framework for wireless sensor networks. Mobile Computing. IEEE Transactions on, 13(6): 1283-1297, 2014.

M. Xie, I. Widjaja, and H. Wang. Enhancing cache robustness for content-centric networking. In INFOCOM. 2012 Proceedings IEEE, pp. 2426-2434. IEEE, 2012.

Y. Yu, D. Wessels, M. Larson, and L. Zhang. Authority server selection in dns caching resolvers. ACM SIGCOMM Computer Communication Review, 42(2):80-86, 2012.

L. Zhang, D. Estrin, J. Burke, V. Jacobson, J. Thornton, D. Smelters, B. Zhang, G. Tsudik, D. Massey, C. Papadopoulos, et al. Named data networking (ndn) project. Technical report, PARC, 20 1 0.

L. Zhu, Z. Hu, J. Heidemann, D. Wesse Is, A. Mankin, and N. Somaiya. Connection-oriented DNS to improve privacy and security. In Proceedings of the 36th IEEE Symposium 011 Security and Privacy, San Jose, California, USA, May 2015. IEEE.

* cited by examiner

METHODS AND SYSTEMS FOR DOMAIN NAME DATA NETWORKING

CROSS REFERENCE TO RELATED APPLICATIONS

This application claims the benefit of U.S. Provisional Patent Application No. 62/194,079 filed Jul. 17, 2015, the disclosure of which is hereby incorporated by reference herein in its entirety.

BACKGROUND

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using memorable domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com," ".net," ".org." etc. Each TLD supports second-level domains, listed immediately to the left of the TLD, e.g., "example" in "www.example.com." Each second-level domain can support a number of third-level domains located immediately to the left of the second-level domain, e.g., "en" in "www.en.example.com." There can be additional level domains as well. For example, a domain with additional domain levels could be "www.landscape.photos.example.com."

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of DNS resource record (A, MX, SOA, etc.), followed by type-specific data such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a reverse lookup process whereby the user enters the desired domain, and the DNS returns appropriate IP numbers. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

Information-centric networking is a general concept for proposed architectures for the Internet in which network names refer directly to content stored in the network (e.g. files) rather than referring to connection endpoints (e.g. servers). Named-data Networking (NDN) and Content-centric Networking (CCNx) are two dominant proposals for protocols to facilitate a reference information-centric network (ICN) architecture. As used herein, the term "ICN" refers to these reference architectures and similar proposals, and the term "information-centric networking" refers to the broader general concept.

An ICN network consists of routers, where each router has a cache that acts as a content store, and edge routers are connected to users and origin servers. The routers can provide content in response to interest packets, which encapsulate requests for content by its name. An origin server is a server that originates the content to be served in the ICN network, thus fulfilling requests of the interest packets. The content is returned in data packets that may or may not be cached in the ICN network. In ICNs, content is forwarded back to a user on the same path as it is requested by that user, and a PIT (pending interest table) at each ICN router records which each interest packet has been fulfilled. A face in ICN is the access point (e.g. a port) at which data is sent or received in a router. Notably, in ICN architectures, names of content maybe hierarchically structured. For example, video produced and published by a producer Example might be referred to as/ndn/com/Example/videos/demo.mpg, where "/" delimits name components.

Current ICN architectures have several design and deployment issues. First, they rely on caching among a dense population of ICN nodes. However, scant deployment of such ICN limits their availability to end users. Second, ICN architectures use an unstructured namespace in which names can be assigned to content by content providers. Doing so makes it challenging to disambiguate which provider is the authority for named content. Third, ICN architectures assume a data-centric security approach that attempts to ensure security through cryptographic signatures on all data packets. In particular, each data packet in ICN is signed by a producer's private key and signatures are verified by the potential consumer. But ICN does not have an architecture for securely discovering and verifying the authenticity of keys.

SUMMARY

In accordance with aspects of the present disclosure, systems, devices and methods for a Domain Name Data Networking (DNDN) content delivery system are disclosed. Embodiments of the systems, methods, and devices perform operations including storing, by a DNS server in the DNDN content delivery system, a local instance of a content object in association with DNS resource records identifying the content object. The operations also include retrieving, by the DNS server, the local instance of the content object using the DNS resource records in response to a request from a client device identifying the first content object. The operations further include providing, by the DNS server, the local instance of the content to the client in response to the request.

DRAWINGS

The present invention will become more fully understood from the detailed description and the accompanying drawings, wherein.

DETAILED DESCRIPTION

The present disclosure is directed to content delivery in distributed information networks. Systems, methods, and computer-readable storage devices in accordance with aspects of the present disclosure provide a Domain Name Data Networking (DNDN) architecture that provides ICN architecture that uses the DNS to store and retrieve content by name, rather than by location. Content in the DNDN network is cached at DNS servers along with resource records to optimize performance and reduce latency. For example, when a user (e.g., consumer) requests content previously served to another user on the same network path or domain, the request can be fulfilled from a cache at a local DNS server (e.g., an edge node of the DNS), rather than a remote server that originally stored the content.

In an exemplary implementation of a DNDN network in accordance with the present disclosure, a content object (e.g., a document or media file) is initially located on a DNS zone's authoritative name server. The DNDN network can cache the content at the same DNS servers that cache resource records that map domain names with IP addresses. In embodiments, the DNS servers within the DNDN network are configured in the same way as primary caching DNS recursive resolvers, and augmented using other available caching recursive resolvers. Thus, when a particular content object is requested, the cache of the DNS recursive resolver is checked for the content object. If the content is not in the cache, the list of peer DNS caches is queried over DNS (e.g., with the Recursion Desired (RD) bit set to 0, which informs these peer nodes that the query should only be answered if it is already in cache). If none of the caches have the requested data, the primary caching recursive resolver is instructed to fetch it. In each case, the query can instruct caches to use DNSSEC (Domain Name System Security Extension) checking (e.g., by setting the DO bit), and optionally ask to have all verification information sent to the primary caching recursive resolver (e.g., by setting the CD bit). This allows the local cache to store content data for future provision to other servers and clients in the DNDN network by directly retrieving the content after the peers and clients have a cache miss.

Advantageously, embodiments of the DNDN network disclosed herein save substantial network overhead by reducing content fetching. Additionally, embodiments provide for name management, operational caching, routing, deployable security, and scalability for content using the DNS infrastructure. For example, some embodiments facilitate security by providing per-packet signing at the data producers and these signatures can be verified by the users (e.g., consumers). Moreover, embodiments use DNSSEC to provide operational secure key learning, source authenticity, integrity protection, and secure denial-of-existence of DNS data. Further, in embodiments content in the DNDN system can be stored and/or transported via the DNS using an existing DNS record type (e.g., a TXT record type, which DNS uses for transporting opportunistic encryption material, sender policy framework (SPF) material, and DNS service discovery material).

Figure 1:
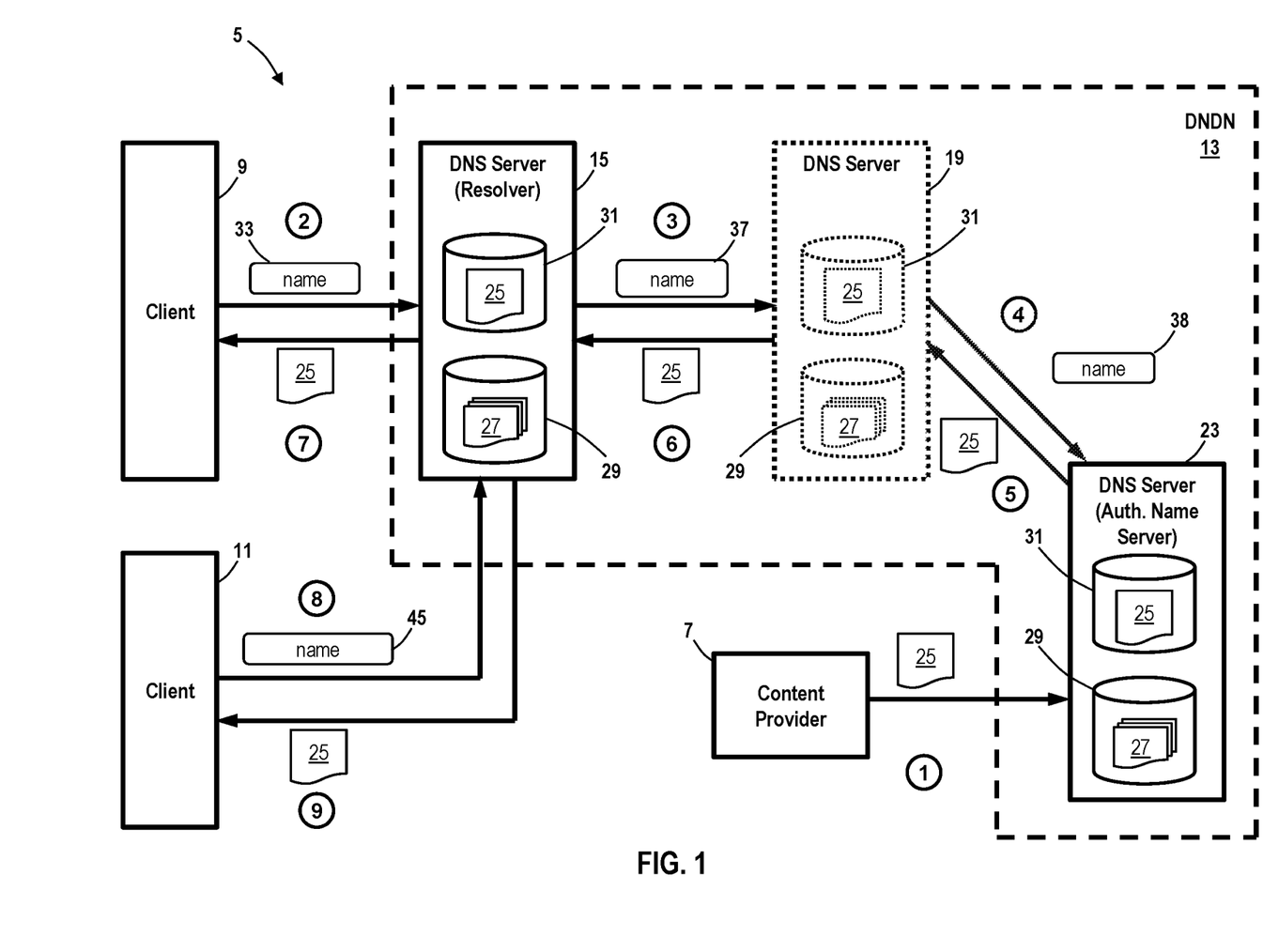
FIG. 1 illustrates a block diagram of an example of an environment for implementing systems and processes in accordance with aspects of the present disclosure.

FIG. 1 illustrates a block diagram of an example of an environment 5 for implementing systems and processes in accordance with aspects of the present disclosure. The environment 5 includes a content provider 7, client device 9, client device 11, and DNDN network 13, which includes DNS servers 15, 19, and 23. The content provider 7 can be any entity that generates or provides computer-readable and/or computer-executable content 25. The content 25 can be one or more data files, including documents, images, videos, computer programs, etc.

In embodiments, client 9 and client 11 are each a device (e.g., a desktop computer or a mobile computing device) of a content consumer that requests content 25 provided by the content provider 7 to the DNDN network 13. In embodiments, the clients 9 and 11 are servers that can be internal or external to the DNDN network 13. For example, client 9 and/or client 11 can be stub resolvers having local caches that store the content 25.

The DNDN network 13 is a DNS modified to store and deliver content in accordance with aspects of the present disclosure. The DNS servers 15, 19, and 23 can be name servers of the DNS that each store DNS resource records 27 in DNS record databases 29 (e.g., zone files) for resolving DNS queries. In some examples, the DNS server 15 can be a caching recursive resolver, the DNS server 19 can be a conditional forwarding server, and DNS server 23 can be an authoritative name server. Additionally, the DNS servers 15, 19, and 23 can each include DNS content caches 31 for storing content 25 in accordance with aspects of the present disclosure. As noted by the hashed-lines, in some embodiments, the DNS server 19 is optional and the DNS server 15 can communicate directly with DNS server 23. It will be understood that the configuration and relationships of the servers 15, 19, and 23 within the DNDN network 13 illustrated in FIG. 1 are merely for the sake of example and that other configurations and relationships are within the scope of the present disclosure. For example, it is understood that the DNDN network 15 includes a greater number of servers 15, 19, and 23 arranged in additional layers or groupings within the DNDN network 15. For example, the DNDN network 15 can include some or all of the components of the DNS.

The environment 5 illustrates a functional flow of an example process by which the clients 9 and 11 can obtain the content 25 using the DNDN network 13 in accordance with aspects of the present disclosure. Numeric elements (1) to (9) are provided to clarify the description of the process illustrated in FIG. 1. Initially, the clients 9 and 11 and DNS servers 15 and 19 lack copies of the content 25. At (1), the DNS server 23 in the DNDN network 13 can receive an instance of the content 25 from the content provider 7. The DNS server 23 may store the content 25 in its DNS content cache 31, which may be included in DNS server 23 or located remotely from DNS server 23. In some embodiments, the DNS server 23 can segment the content 25 into a number of related DNS resource records such that the content 25 can be stored, retrieved, and shared in the same or similar manner as DNS resource records 27. In other embodiments the content 25 is not segmented; rather, the DNS server 23 can store a single DNS resource record including a pointer to the content 25.

At (2), the client 9 sends to the DNDN network 13 a content request message 33 requesting the content 25. In embodiments, the content request message 33 is an ICN interest packet intercepted by the DNDN network 13 and routed to DNS server 15. In accordance with aspects of the present disclosure, the content request message 33 identifies the content 25 by a name (e.g., "name") that is unambiguous and/or unique within the DNDN network 13. From among the various servers of the DNDN 13, the DNS server 15 can receive the content request message 33 based on its geographic or topological proximity to the client 9. Based on the name included in the content request message 33, the DNS server 15 can check the name space of its local DNS content cache 31 for the requested content 25. In accordance with the present example, the DNS content cache 31 of DNS server 15 does not yet include an instance of the content 25 at (2). Instead, at this point in the exemplary process, the content 25 is only stored in the DNDN network 13 by DNS server 23. Accordingly, the DNS server 15 attempts to resolve the content request message 33 within the DNDN network 13. For example, the DNS server 15 can store information directing it to the DNS server 19 or the DNS server 23 based on information included in the content request message 33 (e.g., information identifying a domain of the DNS).

At (3) the DNS server 15 requests the content 25 from the DNDN network 13 by sending content request message 37, including the name of the content 25, to DNS server 19, which can be the same or different than content message 33. In embodiments, the DNS server 19 can be, for example, a forwarding server that forwards the content request message 37 to the DNS server 23 based on a DNS domain name specified in the content request message 37. In embodiments, the DNS server 19 can check a name space of its local DNS content cache 31 for the requested content 25 prior to forwarding the content request. However, in accordance with the present example, the DNS content cache 31 of DNS server 19 does not yet include an instance of the content 25.

At (4) the DNS server 19 requests the content 25 from the DNDN network by sending content request message 38, including the name of the content 25, to DNS server 23. The content request message 38 can be the same or similar to content request message 37. As noted above, the cache 31 of DNS server 23 contains the instance of the content 25, which was provided by the content provider 7 at (1). After determining that its cache 31 contains the content 25 named in the content request 38, at (5) the DNS server 23 responds to the content request message 38 by sending the content 25 to the DNS server 19, which may store an instance of the content 25 in its cache 31. And at (6), the DNS server 19 can respond to the query 37 by sending the content 25 to the DNS server 15, which stores another instance of the content 25 in its cache 31. At (7), the DNS server 15 responds to content request message 33 by sending the content 25 to the client 9, which originally requested the content 25. By the forgoing process, the DNS server 15 obtains an instance of the content 25 from DNS server 23 and stores it locally in its cache 31.

After the content 25 is cached at the DNS server 15 (i.e., after (6) above), at (8) the client 11 (which may be a different entity than client 9) can request the content 25 from the DNDN network 13 by sending a content request message 45. The DNS server 15 receives message 45 and, based on the name included in the content request message 45, the DNS server 15 can check the name space of its local DNS content cache 31 for the name of the requested content 25. If an instance of the content 25 was previously stored in the cache 31 of the DNS server 15 at (6), and if the cached entry is still valid (i.e. the time-to-live has not expired), the DNS server 15 responds to the content request message 45 at (9) by sending an instance of the content 25 to the client 11. Accordingly, the DNDN network 13 in accordance with the present disclosure greatly reduces the latency and network capacity required for the client 11 and subsequent clients to obtain the content 25.

Figure 2:
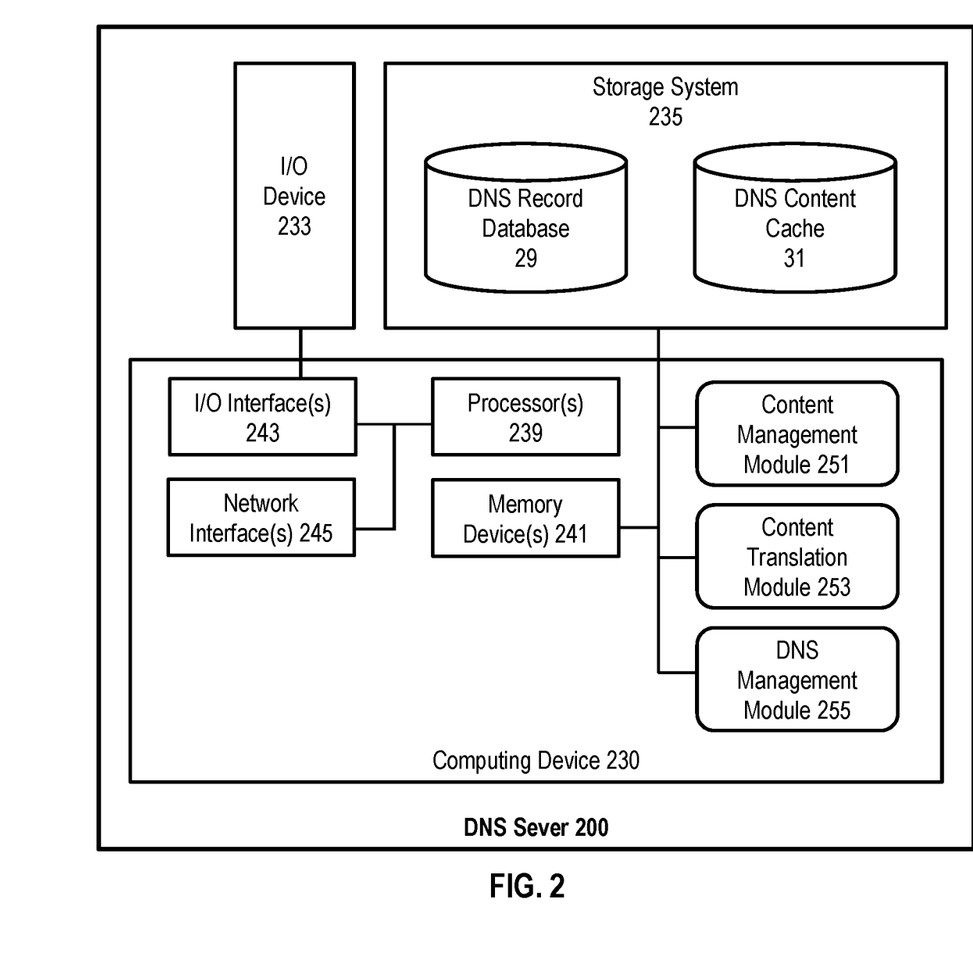
FIG. 2 illustrates a system block diagram of an example server device in accordance with aspects of the present disclosure.

FIG. 2 illustrates a system block diagram of a DNS server 200 in accordance with aspects of the present disclosure. The DNS server 200 can be the same or similar to the DNS servers previously described herein (e.g., DNS servers 15, 19, and 23, and in some embodiments, clients 9 and 11). The DNS server 200 includes hardware and software that perform processes and functions described herein. In particular, the DNS server 200 includes a computing device 230, an input/output (I/O) device 233, and a storage system 235. The I/O device 233 can include any device that enables an individual (e.g., a user) to interact with the DNS server 200 (e.g., a user interface) and/or any device that enables the computing device 230 to communicate with one or more other computing devices using any type of communications link. The I/O device 233 can be, for example, a touchscreen display, pointer device, keyboard, etc.

The storage system 235 can comprise a computer-readable, non-volatile hardware storage device that stores information and program instructions. For example, the storage system 235 can be one or more flash drives and/or hard disk drives. In accordance with aspects of the invention, the storage system 235 can store DNS record database 29 and DNS content cache 31, which can be the same or similar to those previously described herein.

In embodiments, the computing device 230 includes one or more processors 239 (e.g., microprocessor, microchip, or application-specific integrated circuit), one or more memory devices 241 (e.g., RAM and ROM), one or more I/O interfaces 243, and one or more network interfaces 245. The memory device 241 can include a local memory (e.g., a random access memory and a cache memory) employed during execution of program instructions. Additionally, the computing device 230 includes at least one communication channel (e.g., a data bus) by which it communicates with the I/O device 233 and the storage system 235. The processor 239 executes computer program instructions (e.g., an operating system and/or application programs), which can be stored in the memory device 241 and/or storage system 235.

Moreover, the processor 239 can execute computer program instructions of a content management module 251, a content translation module 253, and a DNS management module 255. In accordance with aspects of the present disclosure, the content management module 251 can interactively communicate with client devices (e.g., clients 9 and 11) via a communication channel to receive requests (e.g., content request 33) and provide content objects (e.g., content 25). Additionally, the content management module 251 can interactively communicate with DNS servers (e.g., DNS servers 19, and 23) via a communication channel to request remote content objects (e.g., using content requests 37, 38) and store local instances (e.g., copies) in the DNS content cache 31.

In accordance with aspects of the present disclosure, the content translation module 253 can translate content objects (e.g., content 25) into DNS-compatible records for storage in the DNS content cache 31, and retranslate to content objects back into for transmission to and/or use by end-users (e.g., clients 9 and 11). In embodiments, the content translation module 253 segments content objects into a number a DNS-compatible files (e.g., resource records). For example, the content translation module 253 can segment a single audiovisual file (e.g., a MPEG file) into a number of related DNS resource records and store the DNS resource records in the DNS content cache such that they can be located and retrieved in a manner similar to domain name requests. In an exemplary implementation, a content object comprised of N bytes can be segmented into a number X of resource records, each of which includes a resource record type, a length, and an N/X byte segment of the content object. The content translation module can perform this process in reverse to retranslate the resource records back into the content object. Additionally, in accordance with aspects of the present disclosure, the DNS management module 255 performs functions of a conventional DNS server, such as maintaining a domain name registry (e.g., DNS resourced records 27) in the DNS record database 31 and responding to DNS resolution queries as described previously herein.

It is noted that the computing device 230 can comprise any general purpose computing article of manufacture capable of executing computer program instructions installed thereon (e.g., a personal computer, server, etc.). However, the computing device 230 is only representative of various possible equivalent-computing devices that can perform the processes described herein. To this extent, in embodiments, the functionality provided by the computing device 230 can be any combination of general and/or specific purpose hardware and/or computer program instructions. In each embodiment, the program instructions and hardware can be created using standard programming and engineering techniques, respectively.

Figure 3:
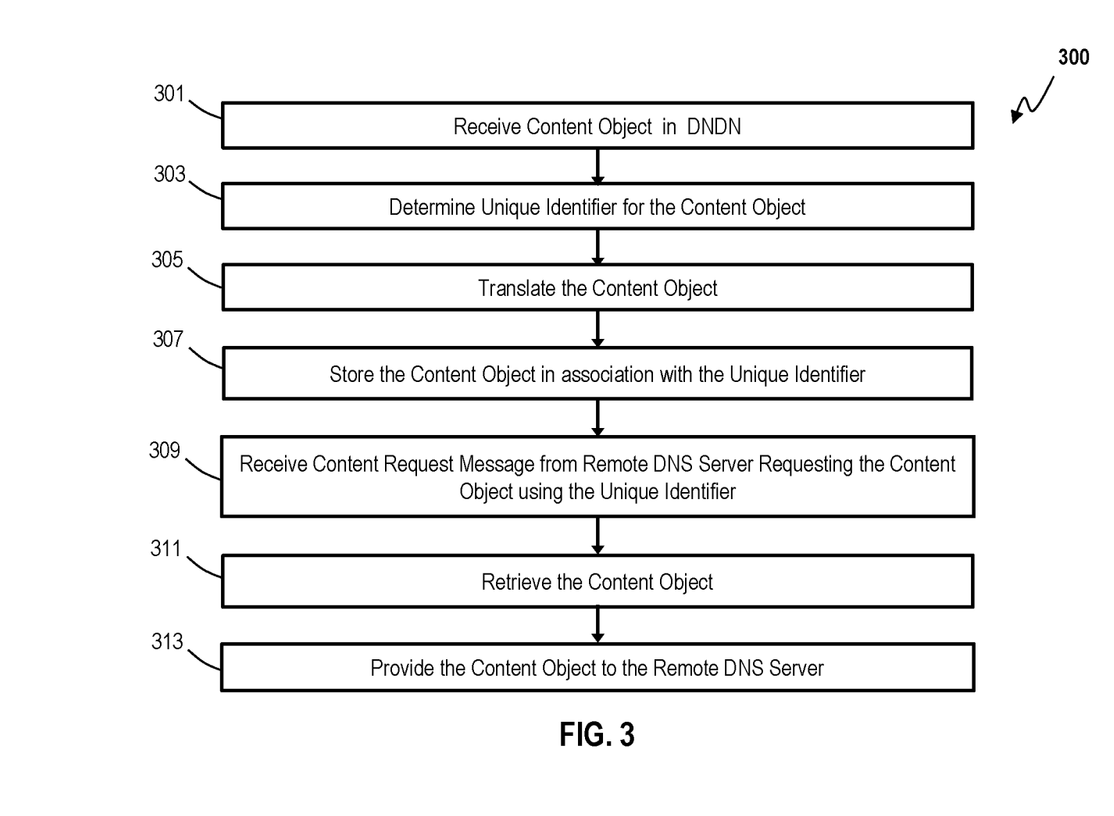
FIG. 3 illustrates a flow diagram of an example of a process in accordance with aspects of the present disclosure.
Figure 4:
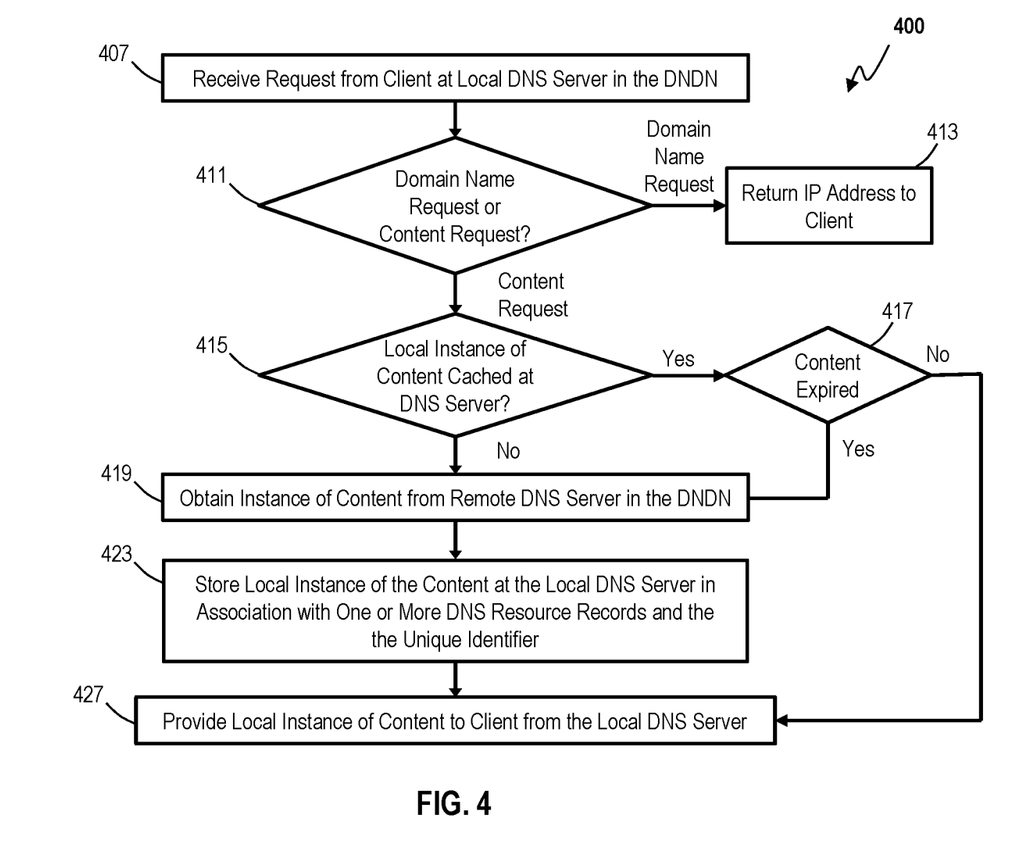
FIG. 4 illustrates a flow diagram of an example of a process in accordance with aspects of the present disclosure.

The flow diagrams in FIGS. 3 and 4 illustrate examples of the functionality and operation of a possible implementation of systems, devices, methods, and computer program products according to various embodiments of the present disclosure. Each block in the flow diagrams of FIGS. 3 and 4 can represent a module, segment, or portion of program instructions, which includes one or more computer executable instructions for implementing the illustrated functions and operations. In some alternative implementations, the functions and/or operations illustrated in a particular block of the flow diagrams can occur out of the order shown in FIGS. 3 and 4. For example, two blocks shown in succession can be executed substantially concurrently, or the blocks can sometimes be executed in the reverse order, depending upon the functionality involved. It will also be noted that each block of the flow diagram and combinations of blocks can be implemented by special purpose hardware-based systems that perform the specified functions or acts, or combinations of special purpose hardware and computer instructions.

FIG. 3 illustrates a flow diagram of an example of a process 300 in accordance with aspects of the present disclosure. At 301 a first DNS server (e.g., DNS server 23 executing content management module 251) in a DNDN network (e.g., DNDN network 13) receives a content object. The content object can be a portion of content (e.g., content 25) or the entire content. The first DNS server can receive the content from a content provider (e.g., content provider 7) or a proxy thereof. At 303, the first DNS server determines a unique identifier (e.g., name) for the content object received at 301. In accordance with aspects of the present invention, the unique identifier is unambiguous in the DNDN network. At 305 the first DNS server (e.g., executing translation module 253) translates the content object received at 301 into a DNS-compatible record. In some embodiments, the first DNS server translates the content object by segmenting it into a number of related DNS resource records, as previously described herein. In other embodiments, the first DNS server translates the content object by associating it with a DNS resource record including a pointer to a storage location of the content object (e.g., in DNS content cache 31). At 307 the first DNS server stores the content object translated at 305 with the unique identifier determined at 303. At 309 the first DNS server receives a content request message (e.g., content request message 37) from a remote DNS server (e.g., DNS server 15 or 19) requesting the content object stored by the first DNS server at 307 using the same unique identifier as was determined at 303. At 311 the first DNS server retrieves the content object requested at 309 based on the unique identifier. At 313 the first DNS server provides the content object to the remote DNS server in response to the request received at 309. The remote DNS server can locally cache the content object by storing it as a DNS-compatible record, as previously described herein.

FIG. 4 illustrates a flow diagram of an example of a process 400 in accordance with aspects of the present disclosure. At 407, a local DNS server (e.g., DNS server 15 executing content request module 251) of a DNDN system (e.g., DNDN network 13) receives a request (e.g., content request message 33) from a client (e.g., client 9). In accordance with aspects of the present disclosure, the request received at 407 can be either a domain name request or a content request (e.g., content request message 33). As detailed previously herein, a content request includes a unique identifier that unambiguously identifies the requested content in the DNDN system. In embodiments, the name in the content request corresponds to a discrete item of content (e.g. content 25), such as a document or media file, of which several instances may be stored (e.g., cached) in the DNDN system. Each instance of the content may have the same characteristics and parameters (e.g., size, author, provider, creation data, and/or time-to-live).

At 411 the local DNS server determines whether the request received at 407 is a domain name request or a content request. If it is determined at 411 that the request is a domain name request, then at 413 the local DNS server returns a DNS information (e.g. an IP address corresponding to the domain name from DNS record database 29) in the conventional manner. If it is determined at 411 that the request is a content request, then at 415 the local DNS server determines whether an instance of the content specified by the name in the request is stored in its cache (e.g., in cache 31 of DNS server 15). If the local DNS server determines that the content is stored in the cache (i.e., 415, "Yes"), then at 417 the local DNS server determines whether the content stored in the cache is expired (e.g., based on time-to-live parameter stored in association with the requested content).

If it is determined at 417 that the content requested in 407 is not expired (i.e., 417, "no"), then at 427, the local DNS server provides the instance of the content from its cache to the client, and the process 400 ends. In some embodiments in which the client is an end user (e.g., a consumer at a personal computing device), content that has been translated into DNS-compatible records (e.g. in process 305) is translated back to its original form (e.g. by content translation module 253) before being provided to the client. In other embodiments in which the client is an end user, the content is provided to as DNS-compatible records and the client translates the content back to its original form using translation software (e.g., content translation module 253). Further, in embodiments in which the client is a server (e.g., a stub resolver or an intermediate DNS server), the content can be stored locally in its translated form (e.g., in DNS content cache 31 as DNS-compatible records).

If at 415 the local DNS server determines that the content is not stored in the cache (i.e., 415, "no"), or if at 417 that the content requested in 407 is expired (i.e., 417, "yes"), then at 419, the local DNS requests the content from the DNDN network (e.g., DNDN network 13) by sending a content request message (e.g., content request messages 37) including the unique name received at 407 to a remote DNS server (e.g., DNS server 19 or 23) which may possess the content. In embodiments, the local DNS server resolves the location of the content in a manner that is the same or similar to recursively resolving an address in the DNS. Additionally or alternatively, the local DNS server resolves the location of the content by sending a content request message (e.g., content address message 37) to a forwarding DNS server (e.g., DNS server 19) which forwards the content address message to the second server (e.g., an authoritative name server, such as DNS server 23) for a domain included in the content request. At 423 the local DNS server stores the instance of the content received at 419 in its cache. At 427, the local DNS server provides an instance of content received at 419 to the client.

As detailed above, the processes 300 and 400 enable the DNDN network disclosed herein to efficiently identify and provide requested content to a client while, at the same time, caching a copy of the content at an edge of the DNDN system in DNS-compatible records. Thus, when a client (e.g., client 11) subsequently requests the same content, it can be provided directly from the local DNS server at the edge of the DNDN system, which reduces latency and processing load throughout the DNDN system.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 239), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units (e.g., memory device 241) and executed by processors. The memory unit can be implemented within the processor or external to the processor (e.g., processor 239), in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

The invention claimed is:

1. A Domain Name System (DNS) server comprising:
a processor,
a data storage device including:
a DNS resource record store that stores DNS resource records for resolving DNS queries, and a DNS content cache that stores one or more instances of content objects; and program instructions stored on the data storage device that, when executed by the processor, control the DNS server to perform operations comprising:
obtaining a content object having a unique identifier, wherein the content object comprises a data file;
storing, in the DNS content cache, an instance of the content object;
storing, in the DNS resource record store, one or more DNS resource records associated with the unique identifier, wherein the one or more DNS resource records comprise a pointer to a storage location of the instance of the content object in the DNS content cache;
receiving, from a client device, a content request that includes the unique identifier;
determining, based on the unique identifier received in the content request, the one or more DNS resource records associated with the unique identifier;
based on the one or more DNS resource records, determining the storage location of the instance of the content object in the DNS content cache; and
providing, to the client device from the DNS content cache, the instance of the content object.

2. The DNS server of claim 1, wherein the DNS content cache stores a plurality of different content objects, each of the different content objects having a unique identifier in a content delivery system.

3. The DNS server of claim 1, wherein the content request is received via a content delivery system.

4. The DNS server of claim 1, wherein:
the obtaining comprises requesting the content object from a second DNS server.

5. The DNS server of claim 1, wherein the operations further comprise determining whether the instance of the content object is expired based on a time-to-live value in the one or more DNS resource records associated with the unique identifier of the content object.

6. The DNS server of claim 1, wherein the data file comprises at least one of a document, a media file, or a computer program.

7. A method for providing a content object, comprising:
obtaining, via a processor of a domain name system (DNS) server, the content object having a unique identifier, wherein the content object comprises a data file;
storing, in a DNS content cache of the DNS server, an instance of the content object;
storing, in a DNS resource record store, one or more DNS resource records associated with the unique identifier, wherein the one or more DNS resource records comprise a pointer to a storage location of the instance of the content object in the DNS content cache;
receiving, from a client device, a content request that includes the unique identifier;
determining, based on the unique identifier received in the content request, the one or more DNS resource records associated with the unique identifier;
based on the one or more DNS resource records, determining the storage location of the instance of the content object in the DNS content cache; and
providing, to the client device from the DNS content cache via the processor, the instance of the content object.

8. The method of claim 7, further comprising storing, in the DNS content cache, a plurality of different content objects, each of the different content objects having a respective unique identifier in a content delivery system.

9. The method of claim 7, wherein the content request is received via a content delivery system.

10. The method of claim 7, wherein:
the obtaining comprises requesting the content object from a second DNS server and receiving the content object from the second DNS server.

11. The method of claim 7, further comprising determining whether the instance of the content object is expired based on a time-to-live value in the one or more DNS resource records associated with the unique identifier of the content object.

12. A content delivery system that performs operations comprising:
storing, by a domain name system (DNS) server in the content delivery system:
an instance of a content object, the content object having a unique identifier, wherein the content object comprises a data file, and wherein the instance of the content object is stored in a DNS content cache included in the DNS server; and
one or more DNS resource records associated with the unique identifier, wherein the one or more DNS resource records comprise a pointer to a storage location of the instance of the content object in the DNS content cache;
receiving, by the DNS server from a client device via the content delivery system, a content request that includes the unique identifier;
determining, based on the unique identifier received in the content request, the one or more DNS resource records associated with the unique identifier;
retrieving, by the DNS server, the instance of the content object from the storage location in the DNS content cache, the storage location determined based on the one or more DNS resource records; and
providing, by the DNS server, the instance of the content object to the client device.

13. The content delivery system of claim 12, wherein the DNS content cache stores a plurality of different content objects, each of the different content objects having a respective unique identifier in the content delivery system.

14. The content delivery system of claim 12, wherein:
the operations further comprise obtaining the content object, the content object obtained by the DNS server from a second DNS server in the content delivery system prior to the DNS server storing the instance of the content object.

15. The content delivery system of claim 12, wherein the operations further comprise determining whether the instance of the content object is expired based on a time-to-live value in the one or more DNS resource records associated with the unique identifier of the content object.

* * * * *